United States Patent [19]

Honer

[11] 3,994,836

[45] Nov. 30, 1976

[54] PROCESS FOR PREPARING FLAME RESISTANT MOLDED ARTICLES OF FOAMED POLYSTYRENE

[76] Inventor: Hermann Honer, Rembertstrasse 11, 28 Bremen, Germany

[22] Filed: Jan. 13, 1975

[21] Appl. No.: 540,496

[52] U.S. Cl. ............................ 260/2.5 B; 260/2.5 FP; 260/42.13; 260/45.7 R; 260/45.8 A; 260/45.8 NT; 260/45.9 R; 260/DIG. 24; 526/1; 526/6; 526/21
[51] Int. Cl.² .......................................... C08J 9/22
[58] Field of Search .................. 260/2.5 FP, 2.5 B

[56] References Cited
UNITED STATES PATENTS

| | | | |
|---|---|---|---|
| 2,862,834 | 12/1958 | Hiler | 260/2.5 B |
| 3,429,836 | 2/1969 | Stastny et al. | 260/2.5 B |
| 3,434,980 | 3/1969 | Stastny et al. | 260/2.5 B |
| 3,554,934 | 1/1971 | Ingram | 260/2.5 FP |
| 3,595,815 | 7/1971 | Willersinn et al. | 260/2.5 FP |
| 3,631,132 | 12/1971 | Westernacher et al. | 260/2.5 FP |
| 3,639,299 | 2/1972 | MacDowall | 260/2.5 FP |
| 3,660,318 | 5/1972 | Taniuchi et al. | 260/2.5 FP |
| 3,661,809 | 5/1972 | Pitts | 260/2.5 AJ |
| 3,686,067 | 8/1972 | Williams | 260/2.5 FP X |
| 3,772,220 | 11/1973 | Parker et al. | 260/2.5 FP X |

OTHER PUBLICATIONS

Lyons, *The Chem. & Uses of Fire Retardants* (Wiley–Interscience, 1970) pp. 248–249.

*Primary Examiner*—Morton Foelak

[57] ABSTRACT

The invention relates to a process for preparing molded articles of foamed polystyrene which are characterised by flame resistance or, respectively, flame retardatory properties, the process comprising foaming expandable polystyrene granulate or bead containing a blowing agent with an aqueous medium containing an alkali silicate, and optionally triglycidyl isocyanurate, a water-soluble amine, and a quaternary ammonium base.

1 Claim, No Drawings

PROCESS FOR PREPARING FLAME RESISTANT MOLDED ARTICLES OF FOAMED POLYSTYRENE

Molded articles of foamed polystyrene may be prepared according to many different methods. Broadest application find the methods wherein styrene polymer beads or a polystyrene granulate of a grain diameter of, for instance, 0,2 to 2 mm containing a blowing agent are prepared and subsequently foamed by the action of hot water or steam. The foaming procedure may be carried out in several steps, a prefoaming step comprising blowing of the polystyrene beads or granules by expanding of the blowing agent by heating to a grain size of several millimeters after which the grains are subjected to a resting time and finally subjected to the final blowing step by the action of steam or hot water in a mold. By this process more or less homogenous micro-cellular foamed molded polystyrene articles having mostly closed pores are prepared. The blowing agent which is usual a low boiling hydrocarbon such as pentane, propylene or a halogenated hydrocarbon, such as methyl chloride or fluorinated ethanes is usually incorporated in the polystyrene already during polymerisation of styrene but may also be added after polymerisation by the action of pressure and temperature.

Flame retardant or self-extinguishing polystyrene foam has been prepared earlier by incorporating a halogen liberating compound in the polymer, such as for instance tris-dibromopropyl phosphate, hexabromo cyclododecane, tetrabromo butane or pentabromo monochloro cyclohexane. However, these compounds involve physiological hazards and are not suited to inhibit rapid combustion of polystyrene foam at higher temperatures. Further the rather high price of these compounds inhibits a broader use.

It is further known to subject polystyrene beads containing a blowing agent to blowing after impregnation of the beads with an alkali silicate solution which may optionally also contain suspended solid hydrated alkali silicates. It has been found suitable to use a rather concentrated solution of sodium silicate having a $Na_2O:SiO_2$ ratio of 1:1,2 to 1:3,5 for impregnation of foamable polystyrene particles. The particles are foamed by heating in a separate step optionally after solidification of the particles by heating to a temperature below the foaming temperature.

It has now been found that in a much simpler way molded articles of foamed polystyrene having improved flame resistance properties may be prepared by a process comprising blowing of polystyrene granulate or beads which contain a blowing agent, if desired in several steps, by using a hot alkali silicate containing aqueous medium said process being characterised in that in at least one blowing step an aqueous medium is used which contains a water soluble alkali silicate or modified alkali silicate having a content of at least 20% by weight of $SiO_2$ and at least 7% by weight of $K_2O$ and 0 to 5% by weight of $Na_2O$ and a viscosity of 35 to 150 centipoises at 20° C, said medium optionally further containing hardeners and/or fillers.

It is prefered to use the hot water blowing process by means of an aqueous solution of potassium silicate having a molar ratio $SiO_2:K_2O$ of at least 2, said solution containing at least 25% by weight of this silicate. The solution may further contain small amounts of sodium silicate or it may contain the potassium silicate in the form of a potassium sodium silicate (double water glass) with up to 5% $Na_2O$.

The water soluble potassium silicates having a molar ratio $SiO_2:K_2O$ of usually between 2 and 4 are known as water glasses. Their concentration is usually measured in degree Baume. The concentrations which are prefered in the process of the invention amount to about 25° Be to 40° Be.

Surprisingly the rather high potassium content of the silicate solutions increases the flame resistance of foamed polystyrene in such a manner that foamed polystyrene articles do not burn at temperatures of more than 800° C.

Especially good results are obtained by using a solution of a modified water glass which is known as a binder and contains as additives triglycidyl isocyanurate, water soluble amines having at least 2 active hydrogen atoms bonded to nitrogen, and quaternary ammonia bases.

The triglycidyl isocyanurate used as additive contains more than 14% by weight of epoxide and is used in amounts of from 0,03 to 2,0% by weight, based on the solids content of the alkali silicate solution.

The water soluble amines used as additives are primary, secondary, aliphatic, alicyclic and aromatic amines such as alkyl amines having 3 to 12 carbon atoms and cycloalkylamines having 5 or 6 carbon atoms as well as 1 to 5 amino groups, benzyl amine, and such amines which further contain inert substituents, such as hydrocarbon groups or functional groups, such as ethanol amines and propanol amines.

The amount of these amines used amounts to usually 0,1 to 5% by weight, based on the solids content of the alkali silicate solution. The amount should be sufficient to provide 0,6 to 1,1 equivalents of active hydrogen atoms to one equivalent of epoxide oxygen of the triglycidyl isocyanurate.

The quaternary ammonium bases used as additives are such containing at least one alkyl radical which is not substituted by a hydroxy group and further straight chain or branched chain alkyl, alkanol, alkoxy, aminoalkyl, cycloalkyl, morpholinyl or piperidyl radicals. The longest alkyl radical of said radicals should not contain more than 12 carbon atomes. It is prefered to use tetraalkyl ammonium hydroxides, having 2 to 12 carbon atoms in each alkyl group. The amount of the quaternary ammonium bases used amounts to 0,1 to 5% by weight, based on the content of $SiO_2$ of the alkali silicate solution.

The hardeners optionally used in the foaming medium are phosphates, carbonates and oxides of divalent and trivalent metals such as calciumhydrogen phosphate; calcium polyphosphate; phosphates of aluminum, zinc, iron; calcium carbonate; oxides of magnesium and zinc and, as rapid hardening additives, alkali silicofluorides. If desired the hardeners can be used as such as in admixture of two or more hardeners. Especially prefered is a mixture of calcium hydrogenphosphate and an alkali silicofluoride, such as sodium silicofluoride.

The fillers to be used in the process of the invention are particulate minerals which are hardly or non combustible such as the silicate minerals asbestos, allophane, aluminite, anthophyllite, and alusite, anorthoclase, kaolinite, leucite, quartz, perlite or the calcareous minerals jura limestone, dolomite and calcite or the aluminum oxide containing minerals bauxite, corundum and diaspore. The amount of fillers used is usually from 5 to 20% by weight, preferably 7 to 15% by weight, based on the weight of the finished molded article of polystyrene foam. The particle size of the fillers is about 1 μm. to about 1 mm., smaller or larger size fractions in a filler blend being possible.

With respect to the other features which are not subject of the invention the process for preparing the molded articles of foamed polystyrene is carried out in a known manner. According to an embodiment of the process the polystyrene beads containing the blowing agent are partly filled into a perforated mold having a size sufficient for being completely filled with the final foamed product. The mold is transferred to a vessel containing a bath of a hot aqueous solution of the alkali silicate compound and, if desired, hardeners and/or fillers. The bath temperature amounts for instance 60° to 80° C. The vessel which is provided with a stirrer is closed and heated under pressure to a temperature of from 115° to 130° C. for 10 to 20 minutes thereby causing the expandable polystyrene beads to produce polystyrene foam which fills the mold. The finished foamed article is taken from the mold and dried.

It has been found that according to a prefered embodiment of the process the foamed article which is not yet fully hardened and is still somewhat compressible may be subjected to a post-hardening process by subjecting to a pressure of from 1 kg./cm². to 20 kg./cm². and subsequently heating to a temperature of from 60° to 80° C for about 15 to 60 minutes. By this treatment compressive strength and flame resistance of the molded article may be considerably increased. This effect is further enhanced by additional impregnation of the molded article with the alkali silicate and preferably also the hardener or hardener mixture and, if desired, the filler before subjecting the molded article to pressure, e.g. in a press. Molded articles of foamed polystyrene thus treated show compressive strength values above 40 kg./cm². and are resistant to temperatures above 1000° C.

According to a further embodiment of the process the expandable polystyrene beads or granules are subjected to a pre-blowing step when losely distributed in the bath. After the pre-blowing step the beads or granules are expanded to a multiple of their volume but still in isolated particle form. The particles may be filled into a mold and subjected to a moderate pressure at elevated temperature in order to interconnect them by bonding. After drying the articles of foamed polystyrene thus formed may be mechanically worked such as by cutting into blocks and sheets. The same process of impregnating with silicate or modified silicate, hardener and/or filler may be applied to the polystyrene particles whether pre-foamed or finally foamed prior to pressing.

The incorporation of silicic acid which has been formed from the alkali silicate by the influence of heat into the polystyrene particles enhances bonding of the simple particles. Possibly the bonding forces are also enhanced by the alkaline reaction of e.g. potassium silicate used. Surprisingly the product is not deteriorated in its properties by this alkaline impregnation step. The properties of the articles such as volume heat resistance, density and pore size are rather maintained or even improved besides the surprisingly large improvement of flame resistance which is reached also as compared to the best known flame retarding additives. This secures a considerable broader spectrum of uses to the products prepared by the process.

The foamed polystyrene molded articles as prepared according to the invention are resistant to temperatures up to at least 400° C. On the action of flames and higher temperature the articles form coke without structural decay but do not burn with free flames. Thus the articles are especially suited for insulating purposes, e.g. in building and construction with certain requirements of flame retarding or, respectively, self-extinguishing properties of the insulating material used.

The invention is illustrated by the following examples.

EXAMPLE 1

Expandable polystyrene beads containing pentane as the blowing agent were filled into a cube shape mold the walls of which consisting of fine wire network. The polymer filled 1/50 of the volume of the mold.

The mold containing the expandable polystyrene beads was placed into a vessel containing an aqueous solution at 70° C. of 25% by weight of potassium silicate consisting of 24% by weight of $SiO_2$ and 10,7% by weight of $K_2O$ and having a viscosity of 46 cP and a concentration of 35° Be. Further the vessel contained a mixture of 5% by weight of $CaHPO_4$ and 5% by weight of sodium silicofluoride, based on the total solution. The vessel was equipped with a stirrer.

The vessel was closed and heated to about 125° C. After 20 minutes the vessel was cooled down and the mold which was filled with a cube shaped foamed polystyrene article was isolated. After cooling the product had a compressive strength of above 20 kg./cm². and did not disintegrate on heating at 950° C.

EXAMPLE 2

Example 1 was repeated but the potassium silicate was replaced by potassium sodium silicate consisting of 2,7% by weight of $Na_2O$, 9,5% by weight of $K_2O$ and 24% by weight of $SiO_2$ having a viscosity of 80 cP (at 20° C) and a concentration of 40° Be which silicate was modified by reaction with 0,1% by weight of triglycidyl isocyanurate, 0,05% by weight of tetraethylene pentamine and 0,3% by weight of tetraethyl ammonium hydroxide, the latter percentage based on the solid content of the silicate. There was obtained a similar cube shaped article being flame resistant at 1100° C.

By subsequent pressing of the still compressible article at a pressure of 5 kg./cm². followed by 30 minutes of heating at 70° C an article was obtained which had a 50% better compressive strength.

EXAMPLE 3

150 g of polystyrene particles foamed according to Example 1, 14 g of perlite dust (size about 1 to 30 mm.), 40 g of calcium hydrogenphosphate, 20 g of sodium silicofluoride, 10 g of kaolin and 250 g of the modified potassium sodium silicate solution of Example 2 were mixed for a short time, filled into a perforated mould and subjected to a pressure of about 7 kg./cm². The block shaped product obtained was dried at a temperature of 75° C for about 30 minutes. The compressive strength of the finished product amounted to over 40 kg./cm². The product was fire resistant up to 1050° C.

I claim:

1. A process for preparing molded articles of foamed polystyrene having improved flame resistance by foaming expandable polystyrene granulate or bead polymer containing a blowing agent, by using a hot aqueous medium containing an alkali silicate and optionally hardening compounds and/or fillers, wherein in at least one foaming step an aqueous medium is used which, based on the solids content of the alkali silicate solution, contains about 0.03% to 2% by weight of triglycidyl isocyanurate with an epoxy content above 14% by weight, about 0.1 to 5% by weight of at least one water-soluble amine selected from the group consisting of alkyl amines having 3 to 12 carbon atoms, cycloalkyl amines having 5 or 6 carbon atoms as well as 1 to 5 amino groups, and benzyl amine, and about 0.1 to 5% by weight of a tetra-alkyl ammonium hydroxide having 2 to 12 carbon atoms in the alkyl group.

* * * * *